A. E. STEVENS.
MOTOR CONTROL APPARATUS.
APPLICATION FILED MAY 19, 1905.
958,442.
Patented May 17, 1910.
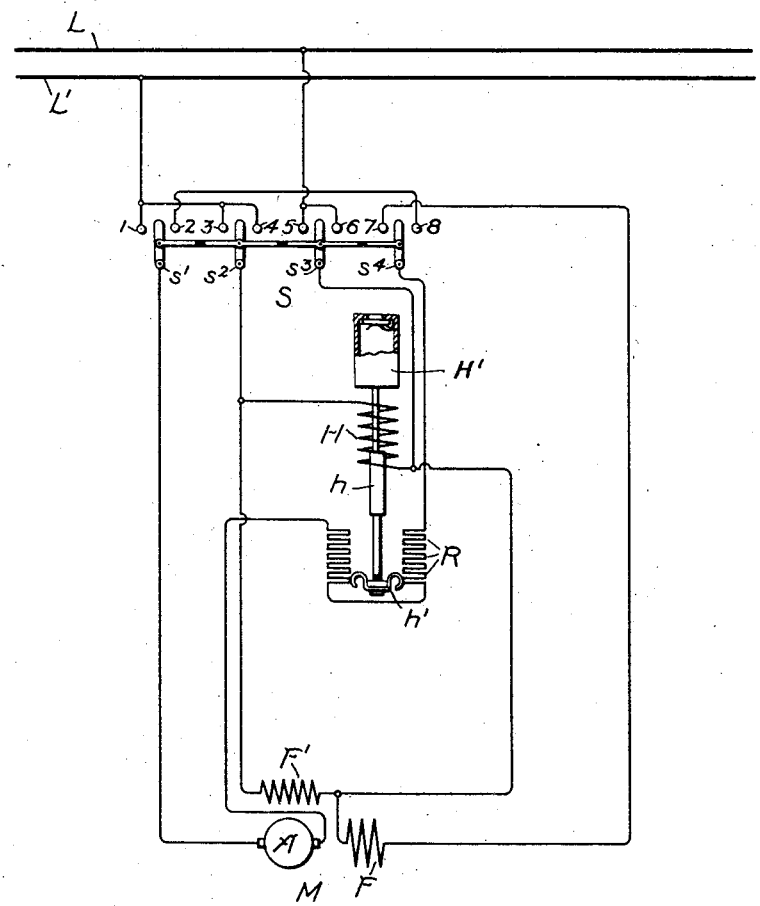
Witnesses
J. Ellis Glen.
Helen Orford
Inventor.
Andrew E. Stevens.
by Albert G. Davis
Atty.

UNITED STATES PATENT OFFICE.

ANDREW E. STEVENS, OF MADISON, WISCONSIN, ASSIGNOR TO NORTHERN ELECTRICAL MANUFACTURING COMPANY, A CORPORATION OF WISCONSIN.

MOTOR-CONTROL APPARATUS.

958,442.     Specification of Letters Patent.     Patented May 17, 1910.

Application filed May 19, 1905. Serial No. 261,145.

*To all whom it may concern:*

Be it known that I, ANDREW E. STEVENS, a citizen of the United States, residing at Madison, county of Dane, State of Wisconsin, have invented certain new and useful Improvements in Motor-Control Apparatus, of which the following is a specification.

The present invention relates to apparatus for starting and stopping electric motors and more particularly those which are used for driving heavy machinery which, when running, have a fly wheel effect. On account of their inertia machines of this character can be started only very slowly and care must be taken that the motors are amply protected from too large currents while the machines are coming up to speed. In like manner care must be exercised in stopping the machine, since an abrupt braking action would produce injurious shocks in the mechanism. Where the motor serves also as a braking generator in stopping the machine, any sudden braking effect would not only injure the machine itself and the motor by reason of the jar produced, but would injure the motor by reason of the excessive current which would have to be generated in order to produce such a braking effect.

The object of the present invention is to provide a simple and efficient control apparatus for an electric motor, whereby it may be started slowly and be gradually brought to rest again without danger of excessive currents through the motor or jar to the motor or to the machinery which is being driven thereby.

To the above ends I have associated with a motor having a shunt field winding, and preferably also a series field winding, an electromagnetically controlled rheostat and a simple double-throw switch with the proper connections, whereby: upon throwing the switch in one direction, the motor may be set into operation with a considerable resistance in the armature circuit, which resistance is then automatically cut out in a gradual manner; and upon throwing the switch in the opposite direction the shunt winding remains energized, the series field winding is cut out, and the armature is short-circuited through the same resistance.

In operating the switch the actuating means for the rheostat is deënergized, so that in braking the entire resistance is initially in the armature circuit. This resistance is then gradually cut out until the armature is short-circuited directly upon itself. By this means the motor is enabled to start very slowly, in order to bring the heavy machinery into motion and, when it is desired to again stop the machine, the braking force is applied gradually so that no sudden shock is produced or a heavy current generated; and, as the speed of the motor and the machine decreases, the braking capacity of the motor is increased until finally the parts are substantially at rest the current generated in the armature is limited only by the speed at which the armature is moved.

The present invention will be more fully understood and further objects will appear in connection with the following description thereof.

The accompanying drawing shows diagrammatically a preferred form of the present invention.

Reference being had to the drawing, M represents a compound wound motor having an armature A, a series field F and the shunt field coil $F^1$; L $L^1$ are the supply mains; R is the starting and braking resistance; H is an electromagnet to the core $h$ of which is secured a contact piece $h^1$ adapted to ride over fixed contacts connected with the resistance, in order to control the resistance; and S is a double throw main switch. The movement of the core $h$ and the contact piece $h^1$ may be retarded in any of the well known and suitable manners, for example, by a dash-pot $H^1$ arranged to retard the upward movement of the core while permitting it to drop freely when the coil H is deënergized. The switch S comprises the movable contact members $s^1$, $s^2$, $s^3$, $s^4$ and two sets of fixed contacts 1, 3, 5 and 7, and 2, 4, 6, and 8. In the position shown, the switch is in its neutral position, all circuits being interrupted.

Upon moving it to the left, however, bringing the movable contacts into engagement with the contacts 1, 3, 5 and 7, circuits are established as follows:—from line L¹, through $s^1$, motor armature A, resistance R, switch-arm $s^4$, field F, switch-arm $s^3$ to line L; also from line L¹, through switch-arm $s^2$, shunt field winding F¹, switch-arm $s^3$, to line L; and from line L¹, through switch-arm $s^2$, coil of the electromagnet H, switch-arm $s^3$, to line L. The motor is now connected for operation with the entire resistance in circuit, and this resistance is gradually cut out as the core of the electromagnet is drawn upwardly.

When it is desired to stop the machine, the switch S is moved to the right and now, while current continues to flow through the coil of the electromagnet H and through the shunt field F¹ as before, the series field F is cut out at contact 7 and the motor armature terminals are connected together through switch-arm $s^1$, switch-arm $s^4$ and resistance R. It is evident that when the switch is moved from the extreme left to the extreme right the circuit through the coil of electromagnet H is interrupted, thereby permitting the core $h$ to drop. Therefore when the short-circuit of the motor armature is effected the entire resistance is included therein. The motor now acts as a generator having a separately excited field and exerts a braking tendency upon the moving machinery. By making the resistance R sufficiently great, the initial current which is generated may be kept quite small so that the braking force is of such magnitude as not to produce a sudden jar upon the moving parts. As the core of the electromagnet rises, the resistance in the armature circuit is reduced so that the current value may increase; but by reason of the slowing down of the parts the current cannot increase beyond a safe maximum. It is to be noted that the starting and stopping processes are substantially identical, so that a good braking action is obtained without in any way detracting from the efficiency of the apparatus in starting.

In the drawing the terminals of the coil of electromagnet H and the terminals of the shunt field coil F¹ are shown as connected together permanently, thereby forming a complete circuit through the two coils. By this arrangement each coil serves to receive the discharge from the other upon the interruption of the supply current.

Although I have illustrated a compound wound motor as the one best adapted for operating heavy machinery such as centrifugal machines and other machines having a fly wheel effect, it is evident that a simple shunt motor may be employed and furthermore, that various other changes may be made in the construction and arrangement of parts without departing from the scope of the present invention.

What I claim as new and desire to secure by Letters Patent of the United States, is,—

1. In combination, a motor, a source of current supply, a resistance, a controlling member for said resistance, a switch, and connections whereby said controlling member is automatically operated in one direction to cut the resistance out of the motor circuit when the switch is in one position and when the switch is in another position to short circuit the motor armature through said resistance and automatically cut the resistance out of circuit by a movement in the same direction.

2. In combination, a motor, a source of current supply, a resistance, a controlling member for said resistance, a switch having a starting and a stopping position, means whereby said controlling member is automatically operated to cut the resistance out of the motor circuit when the switch is in the starting position and short circuit the motor armature through said resistance and automatically cut the resistance out of circuit when the switch is moved to stopping position, and connections whereby the controlling member returns to the full resistance position as the switch is moved from the starting to the stopping position.

3. In combination, a motor, a source of current supply, a resistance, a controlling member for said resistance biased to starting position, an electromagnetic device for moving said member to running position, a switch having a starting and a stopping position, connections whereby said electromagnetic device is energized to cut the resistance out of the motor circuit when the switch is moved to starting position and to short circuit the motor armature through said resistance and again energize the electromagnetic device to cut the resistance out of circuit when the switch is moved to stopping position, said electromagnetic device being deënergized to permit the controlling member to return to starting position as the switch is moved from starting to stopping position.

4. In combination, a motor, a source of current supply, a resistance, a double-pole switch arranged to connect the motor to said source of supply with said resistance in circuit in one position and to short-circuit the armature through said resistance in the other position, a controlling member for the resistance having a bias to full resistance position, and an electromagnetic device controlled by said switch and energized in both positions thereof for cutting out said resistance.

5. In combination, a shunt motor, a source of current supply, a resistance, a switch for alternately connecting said motor to said source of supply for operation as a motor with said resistance in circuit and as a generator with the armature short-circuited through said resistance, and an electromagnetic device connected in parallel with the shunt field and controlled by said switch for gradually and automatically cutting out said resistance by a movement in one direction when the motor is operating as a motor and by a movement in the same direction when operating as a generator.

In witness whereof, I have hereunto set my hand this 15th day of May, 1905.

ANDREW E. STEVENS.

Witnesses:
H. L. MORRIS,
A. J. BUENZLI.